United States Patent [19]

Lebowitz

[11] Patent Number: 5,125,021
[45] Date of Patent: Jun. 23, 1992

[54] CELLULAR NETWORK DATA TRANSMISSION SYSTEM

[76] Inventor: Mayer M. Lebowitz, 5515 Northaven Rd., Dallas, Tex. 75229

[21] Appl. No.: 486,425

[22] Filed: Feb. 28, 1990

Related U.S. Application Data

[63] Continuation-in-part of Ser. No. 401,651, Aug. 31, 1989.

[51] Int. Cl.$^5$ .......................................... H04M 11/04
[52] U.S. Cl. ...................................... 379/40; 379/39; 379/42; 379/59
[58] Field of Search ...................... 379/40, 39, 33, 42, 379/59, 60; 455/33

[56] References Cited

U.S. PATENT DOCUMENTS

| | | | |
|---|---|---|---|
| 4,856,047 | 8/1989 | Saunders | 379/40 |
| 4,868,859 | 9/1989 | Sheffer | 379/39 |
| 4,887,290 | 12/1989 | Dop et al. | 379/40 |
| 4,972,455 | 11/1990 | Phillips et al. | 379/59 |
| 4,993,059 | 2/1991 | Smith et al. | 379/59 |

OTHER PUBLICATIONS

UK Patent Application GM 2194119, Security Services PLC, Ian S. Parry, Status Reporting Apparatus, 24 Feb. 1988.
Int'l Application Pub. No. WO 89/05553, BT Telecom, Inc. Sheffer, 15 Jun. 1989.

*Primary Examiner*—James L. Dwyer
*Assistant Examiner*—Stella L. Woo
*Attorney, Agent, or Firm*—Terry M. Gernstein

[57] ABSTRACT

A data transmission network uses a cellular network as a primary telecommunications link and a backup telecommunications link. The system continuously monitors the links and switches to the back up link if the cellular link is not operative. A software package is included in the computer at a monitoring station for effecting integrity checks of the links, and RF fault modules are also included.

14 Claims, 4 Drawing Sheets

CELLULAR NETWORK DATA TRANSMISSION SYSTEM

This is a continuation-in-part of copending application Ser. No. 07/401,651 filed on Aug. 31, 1989.

TECHNICAL FIELD OF THE INVENTION

The present invention relates to the general art of telecommunications, and to the particular field of over-the-air telecommunications. Specifically, the present invention relates to the field of cellular telecommunications.

BACKGROUND OF THE INVENTION

There are many situations in which remote monitoring of various conditions in desirable. For example, up-to-the minute status of high voltage feeder circuit breakers in electrical substations have been monitored in a remote manner, as well as other state conditions sensors, such as pressure, temperature, liquid level and the like, intrusion sensors are often monitored in a remote manner as are smoke detectors. Recently, medical information and even the location of a person have been monitored in a remote manner.

In the past, such remote monitoring equipment has used land line communication between the monitoring equipment and the monitoring station. However, such land lines communication links can be subject to several drawbacks. For example, in severe weather conditions or in wet climates, the land lines may be damaged by weather conditions or water. Such damage may degrade the link to such as extent that data transmitted over such link, if transmission is not totally interrupted, may become unreliable. Furthermore, land line communications may be subject to being deliberately interrupted by an intruder.

To overcome such problems, there have been several proposals in the art for including a radio link as a backup to a land line link. Such systems use the land line link if it is available, and switch to the radio link if the land line link is not operative.

While, somewhat successful in avoiding the problems associated with a link consisting only of a land line, such land line/radio link systems still have certain drawbacks. For example, a radio link may not permit a system integrity check which includes a "kiss off" signal from a monitoring station back to a subscriber premises to assure completion of the call, and there may not be a good method of determining the integrity of the link and ensuring that the monitoring station is on line with the subscriber premises station. If, for example, the antenna at the subscriber station has been damaged, the link may not be properly established, and radio links may not be able to monitor such condition. Many radio link stations may be open and accessible to many people and thus may be subject to tampering.

Many, such links may require a "push-to-talk" communication system which restricts the use of supervisory methods which monitor system operation and reliability. While some radio systems may include a polling feature that includes a periodic transmission permitting the receiver and the transmitter to communicate with each other, such polling is only done on a periodic basis and may still not ensure an entirely reliable system. A constant monitoring of the system integrity should be used to ensure full system reliability.

Still another problem with using radio links is that several repeater stations may be required in addition to a base station to cover a prescribed area. Additionally, the radio transmitters at the subscriber premises may be restricted to low power outputs and may be able to communicate only within a certain geographic area and report to only one receiver. Furthermore, if a repeater station fails, incoming signals may be lost.

Still further, radio transmits may be restricted in the number of radio channels that can be used in a particular geographic area. This may require subscribers to share channels, and create a potentially undesirable situation. Furthermore, if two or more radio transmitters key (transmit) at the same time, it may be possible that no communication is received at the monitoring station. System overload is also possible with such systems.

Yet a further problem with radio links is the limited adaptability thereof. For example, radio links may not be amenable to use with premises monitoring equipment that includes the transmission of slow scan, freeze frame, or real time CCTV, or to use with supervisory monitoring equipment that might include computer controlled fault-monitoring equipment. More importantly, such systems may not be completely usable with a system that includes downloading of information from the monitoring station to the subscriber station. That is, it may not be possible to efficiently send all of the information and data signal that are necessary for efficiently monitoring a premises from the monitoring station to the subscriber station over such links.

Yet a further problem with such systems is inherent in the switching system itself. That is, as mentioned above, these systems, attempt to communicate with the monitoring station via a land line, and if such land line is inoperative, will switch to a radio link. This requirement may make the integrity of the system dependent on the switching system, and should this system become damaged or inoperative, the entire system will become inoperative. It can even be possible to view the overall integrity of the overall system as being a function of the integrity of the switching system. The switching operation may, in some cases, interrupt the data signal and introduce a spike into the signal, and therefore, influence the content and reliability of such signal. In some circumstances, the data can be of such a character that the switching operation may affect such data.

Therefore, those system that use only a land line link between a subscriber station and a monitoring station have problems, and those systems that include a radio link backup and switch to that radio link if the land line link is inoperative also have several restrictions and drawbacks.

The art also includes examples of premises-monitoring systems that include cellular link between the subscriber station and the monitoring station. While overcoming many of the problems associated with land line links and radio links alone, such cellular links still have certain drawbacks. For example, systems using a cellular link exclusively do not have a failsafe capability of a back-up system. If, for some reason, the cellular link is damaged or destroyed, those systems which rely on the cellular link for the exclusive means of establishing communicating between the subscriber station and the monitoring station can be rendered inoperative.

Therefore, there is a need for a premises-monitoring system which includes a link between the subscriber station and the monitoring station which has a very high level of integrity, yet which also has the ability to cover a large geographic area that can include several monitoring stations with a multiplicity of frequencies and is amendable to a wide variety of monitoring elements and can be downloaded from the monitoring station to the subscriber station over all links.

OBJECTS OF THE INVENTION

It is a main object of the present invention to provide a premises-monitoring system which includes a link between a subscriber station and a monitoring station that has a very high level of integrity.

It is another object of the present invention to provide a premises-monitoring system which includes a link between a subscriber station and a monitoring station that has a very high level of integrity yet which also has the ability to cover a large geographic area that has several monitoring stations therein.

It is another object of the present invention to provide a premises-monitoring system which includes a link between a subscriber station and a monitoring station that has a very high level of integrity yet which also has the ability to cover a large geographic area that has several monitoring stations therein with a multiplicity of frequencies.

It is another object of the present invention to provide a premises-monitoring system which includes a link between a subscriber station and a monitoring station that has a very high level of integrity yet which also has the ability to cover a large geographic area that has several monitoring stations therein with a multiplicity of frequencies and is amenable to a wide variety of monitoring elements.

It is another object of the present invention to provide a premises-monitoring system which includes a link between a subscriber station and a monitoring station that has a very high level of integrity yet which also has the ability to cover a large geographic area that has several monitoring stations therein with a multiplicity of frequencies and is amenable to a wide variety of monitoring elements and which can be downloaded from the monitoring station to the subscriber stations over all portions of the overall link between those subscriber stations and the monitoring station.

It is more specific object of the present invention to provide a premises-monitoring system which includes a link between a subscriber station and a monitoring station that has a very high level of integrity and which has a kiss-off capability.

It is more specific object of the present invention to provide a premises-monitoring system which includes a link between a subscriber station and a monitoring station that has a very high level of integrity and which can be continuously monitored and switched from a primary link to a backup link before a data signal from a premises-monitoring element is generated so that such data signal with not be affected by any switching functions inherent in the network.

It is a more specific object of the present invention to provide a premises-monitoring system which includes a link between a subscriber station and a monitoring station that has a very high level of integrity and which can have data downloaded over both primary link and a backup link if necessary.

It is a more specific object of the present invention to provide a premises-monitoring system which includes a link between a subscriber station and a monitoring station that has a very high level of integrity and which is not subject to tampering.

It is a more specific object of the present invention to provide a premises-monitoring system which includes a link between a subscriber station and a monitoring station that has a very high level of integrity and which can select one of a plurality of monitoring stations for use with a particular subscriber station.

It is a more specific object of the present invention to provide a premises-monitoring system which includes a link between a subscriber station and a monitoring station that has a very high level of integrity and which can include a computer-controlled supervisory fault-monitoring system for further ensuring system overall integrity.

SUMMARY OF THE INVENTION

These, and other, objects are achieved by providing a premises-monitoring system that includes a land line link between a subscriber station and a monitoring station as a back up link to a cellular link between such stations.

The system further includes means for constantly monitoring the integrity of the cellular link and switching to the land line link if the cellular link is not operating properly. Such means can effect the switch before the monitoring equipment transmits a signal thereby maintaining a link between the subscriber station and the monitoring station that is operative before and when the data signal is sent from the subscriber station premises-monitoring equipment. Data can be sent both ways over both the primary and the backup links at all times so that constant communication can be established and maintained at all times.

DESCRIPTION OF THE DRAWINGS FIGURES

DETAILED DESCRIPTION OF THE PREFERRED EMBODIMENT OF THE INVENTION

Figure 1:
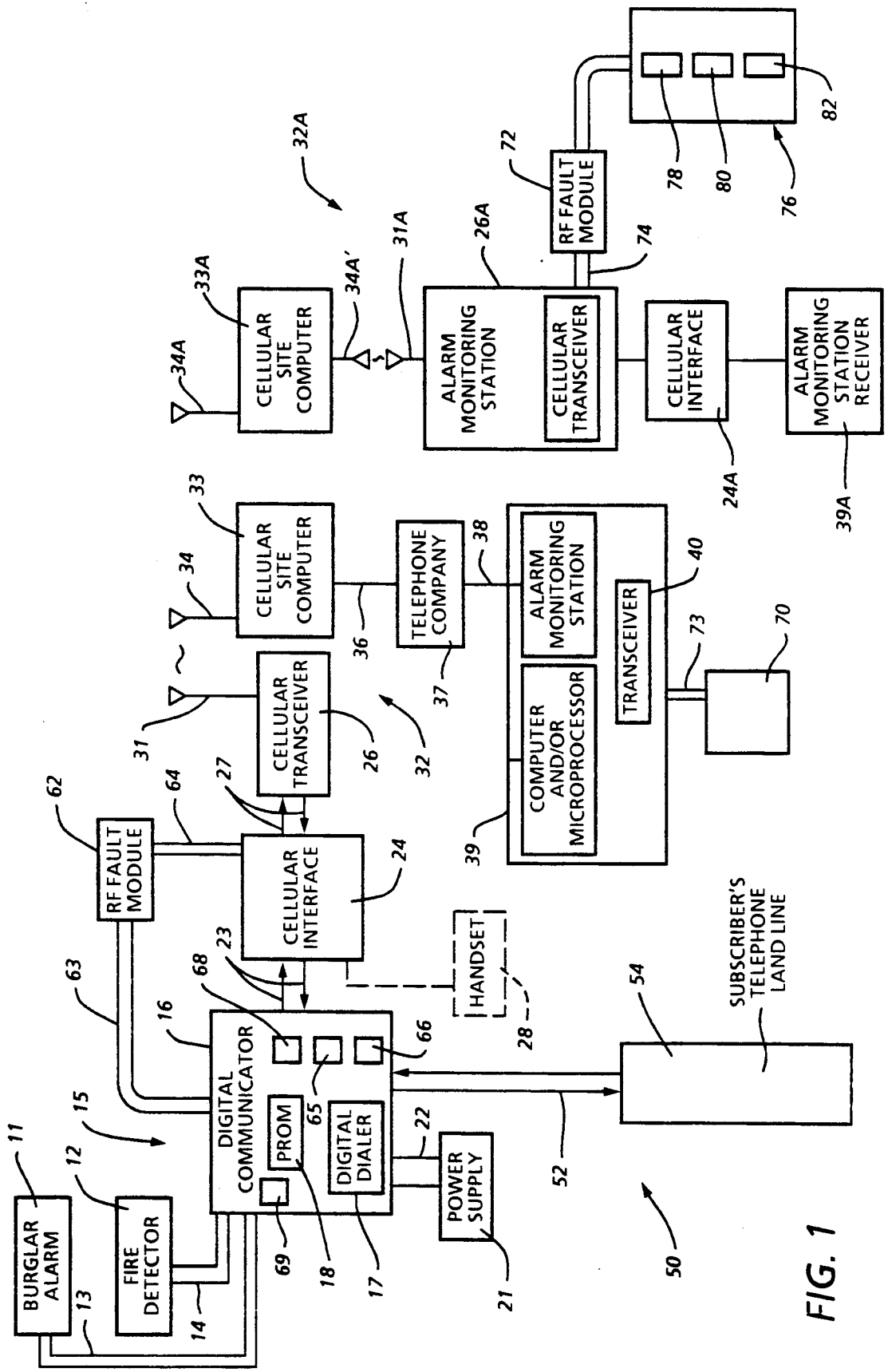
FIG. 1 illustrates an overall premises-monitoring system of the present invention using a cellular link as the primary communications link between a subscriber station and a monitoring station with a landline link as a backup communications link.

As shown in FIG. 1, sensor circuitry 10 located on a subscriber station premises can include a plurality of sensors, such as a burglar alarm 11, a fire detector 12, or the like located to various positions on the premises. As discussed in U.S. Pat. No. 4,825,457, the disclosure of which is incorporated herein by reference, these sensors generate an electrical signal in response to the detected event, and such signals are conducted via conductors, such as conductors 13 and 14, to first transmission circuitry 15 which includes a digital communicator 16.

The digital communicator 16 includes a digital dialer 17 and a programmable memory means such as a PROM 18. The PROM 18 is programmed with specific data such as the identification number of the site, account number, the emergency code (for fire, burglary, medical or the like), and the telephone number(s) of any alarm monitoring station(s) to be called as will be explained hereinafter. The PROM 18 can be removed and replaced as necessary and is connected to a suitable source of electrical power such as power supply 21 connected to the digital communicator via conductors, such as conductor 22.

The output of the digital communicator 16 and the digital dialer 17 is connected by means of conductors 23 to a cellular interface 24 which provides a telephone line tone and voltage to the digital communicator 16 and digital dialer 17. Upon receiving the electronic signal (that comprises the telephone number to be dialed) from the digital dialer 17, that signal and an electronic "send" signal are then electronically entered into a transceiver 26 by means of conductors, such as conductor 27. The cellular interface provides a path of communication between the digital communicator 16, the digital dialer 17 and the cellular transceiver 26.

A telephone handset 28 may also be connected to the interface 24 as discussed in the incorporated patent. The transceiver 26 also includes an antenna 31 my means of which data may be transmitted over-the-air to a cellular network 32.

The cellular network antenna site 32 includes a cellular site computer 33 and an antenna 34 by means of which transmissions emanating from the transceiver antenna 31 are received. The cellular site computer 33 is connected by telephone landlines 36 to a commercial telephone company 37 which is connected by telephone landlines 38 to an alarm monitoring station 39. The alarm monitoring station is also provided with a computer and/or microprocessor and a transceiver 40.

The cellular link between the monitored premises and the monitoring station is the primary communications link between such stations, and once a signal from one of the sensors is generated, such signal is transmitted to the digital communicator 16. A telephone dial tone signal is provided to the digital dialer 17 from the cellular interface 24, and the digital dialer then transmits the telephone number of the alarm monitoring station 39 to the transceiver 26 via the interface 24 which sends this number over the cellular network 32 from antenna 31 to antenna 34. Of course, the signals are placed in a form that is appropriate for transmission over the selected link.

The telephone connection is made from the cellular network site 33 to the telephone company 37 to the alarm monitoring station 39. A "handshake" tone is sent back to the digital communicator 16 from the alarm monitoring station computer following which data appropriately stored in the PROM 18 is sent to the alarm monitoring station to complete the transmission of the emergency regarding the alarm condition. Communication is terminated by a "kiss-off" tone transmitted from the alarm monitoring station 39 to the transceiver 26, and proper notification of police, fire department, health care personnel or the like is accomplished by the alarm monitoring station.

The digital communicator can be programmed with several different telephone numbers so that in case no "hand-shake" signal is received from a central monitoring station computer after several transmission attempts, the digital communicator will "call" some other telephone number programmed within the PROM.

The cellular network site 32 may, via its antenna 34, retransmit the signal it receives from the subscriber's cellular transceiver 26 via its antenna 31 (without going through a telephone landline) to another cellular network site 32A, to a cellular transceiver located at the central monitoring station 26A via antenna 31A to a cellular interface 24A, also at the central monitoring station 39A connected to a central monitoring station data processing computer.

The system thus far described can provide two-way communication between the monitoring station and the monitored premises as the microprocessor at the alarm monitoring station can "call up" the alarm system at the subscriber premises and obtain data therefrom. The alarm monitoring station can also send data to the subscriber station via the cellular network and thus the system is capable of uploading and downloading via the just-described cellular system.

Thus, the alarm monitoring station can call the monitored alarm system on the subscriber premises via the cellular network and the PROM can be programmed to "open up" its memory to the alarm monitoring station, or to "hang up" the line and call back either a special telephone number or to call back the alarm monitoring station computer. This can be accomplished after a predetermined number of rings is allowed at the subscriber's premises by the initiating caller, i.e., the alarm monitoring station. After a "connection" is made between the alarm monitoring station computer and the monitored alarm system on the subscriber premises a special "code" is sent by the alarm monitoring station computer to the monitored alarm system which then "opens up" its memory to the alarm monitoring station computer for interrogation and/or re-programming. This is accomplished on receipt of a special code from the alarm monitoring station computer. The PROM will be placed in a code-amending mode whereby various codes within the alarm system on the subscriber premises can be altered, amended, disconnected or the like.

The alarm system can be used in conjunction with a variety of different premises monitoring sensors, such as listening devices, slow scan television monitors and the like.

As discussed above, the overall system of the present invention utilizes a landline communication link as a back up to the above-described cellular communication link as well as fault-monitoring equipment and switching equipment to determine the integrity of both links and to switch to the most reliable link.

This back up system is shown in FIG. 1 as including a landline link 50 connected at one end to the subscriber digital communicator by conductors, such as conductor 52 and at the other end to the alarm monitoring station via landlines, such as landline system 54. An RF fault module 62 which is connected to the digital communicator 16 by conductors, such as conductor 63 and to the cellular interface by conductors, such as conductor 64, and which continuously monitors the integrity of the cellular interface/transceiver. The system also includes selection circuitry 65 and switching circuitry 66 connected to the fault module as well as second transmission circuitry 68 that is adapted to transmit data over landline networks. Such selection circuitry, switching circuitry and transmission circuitry are well known in the art, and thus will not be described in detail. A selection circuit 69 can also be included to select one of a plurality of monitoring stations in sequence as the destination for the transmissions of data and for prompting the transmission circuitries to transmit data to each of the plurality of monitoring stations.

In the event the cellular communications link is not operative, the switching circuitry is activated and data is sent via the landline link 50. As discussed above, the overall system can include several monitoring stations, and thus, the first and second transmission circuitry described above includes means for searching for a proper monitoring station over the particular communication link being used. That is, if the landline link is being used, the selection circuitry is used to select the proper monitoring station via the landline link, and if the cellular communication link is being used, the PROM is used to select the proper monitoring station via the cellular link.

Also included in the communications system shown in FIG. 1 is an RF fault module associated with each of the monitoring stations, such as RF fault module 70 associated with the station 39 and RF fault module 72 associated with the station 26A, each connected to an interface of the associated station by conductors, such as conductors 73 and 74 respectively. Each fault module is connected to an alarm device, such as device 76 associated with the fault module 72 and which includes a visible indicator 78 and an audible indicator 80 to signal if an interface/transceiver fails at a Central Station, and includes its own power supply 82 that acts as a backup power supply to utility power.

The fault circuitry of the present system monitors the communication links in a continuous manner as well as during an attempt to communicate using the links. Thus, the modules are used to monitor the integrity of the links while when no alarm signals are being sent over the links and when the system is being used to communicate during an alarm situation. In this manner, the integrity of the system is constantly being checked and monitored.

If the system is used in the absence of an alarm situation, the various downloading, uploading, handshake and kiss-off signals are used to check the integrity of the system, and if the system is monitored during an alarm situation, the attempts to communicate by the PROM are used as a criteria of integrity.

Figure 2:
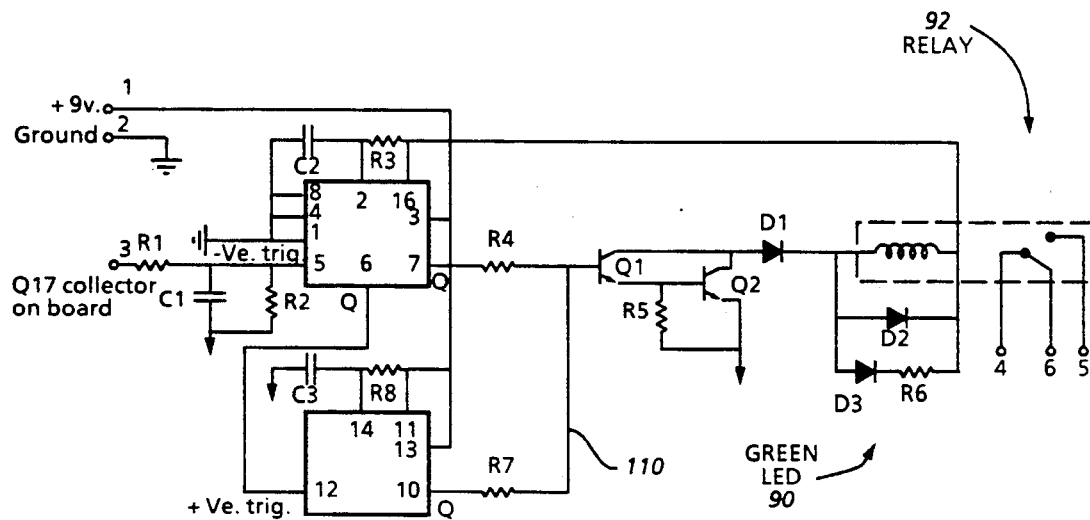
FIG. 2 is a circuit diagram illustrating an RF fault module used in conjunction with the system shown in FIG. 1.
Figure 3:
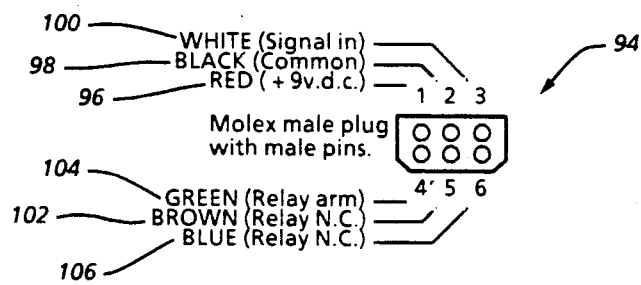
FIG. 3 is a diagram illustrating a cable connection between the RF fault module and the associated elements.
Figure 4:
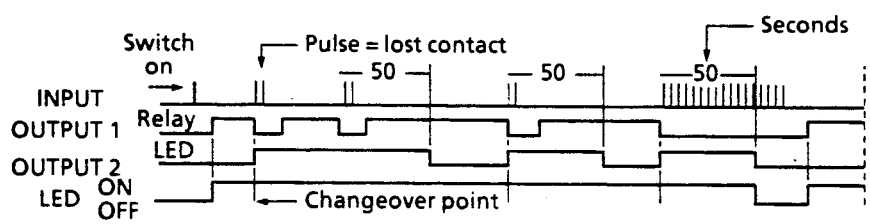
FIG. 4 is a timing diagram illustrating the time of the various events associated with the RF fault module.

The preferred form of the RF fault module is shown in FIGS. 2, 3 and 4, and the attention is now directed to such figures. As shown in FIG. 2, the circuit includes a green LED 90 and a relay 92. The RF fault module electronically "reads" the integrity of the data link between the cellular transceiver located on the subscriber's premises and the cellular network cell site. If the RF data link "goes away" for any reason, the RF fault module activates the green LED and the relay. The cellular interface also includes a red LED which glows steadily when the RF link id in tact, and blinks when the RF data link is lost.

The RF fault module electronically monitors the circuitry in the cellular data interface that causes the red LED thereon to function. This is effected by adding a three wire cable 94, best shown in FIG. 3, to strategically located components within the data interface. The three wire cable is brought out of the interface and then into the RF fault module via a red wire 96, a black wire 98 and a white wire 100. These wires electronically "read" the presence of the RF data link between the cellular transceiver and the cellular network cell site. The green LED 90 associated with the RF fault module gives a visual indication of the presence or lack of presence of the RF data link. A three wire output includes a brown wire 102, a green wire 104 and a blue wire 106 and is used to provide an electro-mechanical output of the same conditions.

The output of the RF fault module is, preferably, wired directly to an alarm control panel to activate the digital dialer to call up the central station via the landline link if the RF data link is lost and hence the cellular transceiver is inoperable.

As shown in FIG. 2, the module circuit includes transistors Q1 and Q2; diodes D1 and D2; and resistors R1-R8 which are 2.0K, 100K, 470K, 47K, 4.7K, 1.0K and 3.3 Meg respectively; capacitors C1-C3 which are 0.01 microfarad, 10.0 microfarad, and 15.0 microfarad respectively. The LED 90 is a bright green LED #LTL4234, the relay 92 is an Aromat HA1DC9V relay, the plug associated with the cable 94 is a Molex 6-pin male plug 03-09-2063, and the pins are Molex male terminal 02-06-6103, with the cable being a 6" 20 AWG stranded 6-conductor cable.

It is also noted that the circuit includes a jumper 110. If the jumper is in tact, there is a timing delay before the relay and the green LED are activated; however, if the jumper is cut, these elements are activated immediately upon the loss of the RF link. The time delay is used to eliminate false alarms due to a momentary loss of the RF link. For example, with the jumper in tact, a delay of, for example, fifty seconds or ninety seconds can be used before the relay and the green LED are activated.

This delay is illustrated in the timing diagram shown in FIG. 4. With the jumper 110 in tact, there is no activation of the LED or the relay until the timing circuitry sees a los of RF for the full period. Thus, as shown, the first two time frames show a loss of RF for only about five seconds, not enough time for activation. There can be several windows of lost RF, but the RF fault module will not activate until there is one full period matching the preset time period, when the jumper is in tact. If the jumper is cut, any loss of RF will immediately activate the relay and the LED. It is noted that, in FIG. 4, the output 1 corresponds to the relay, output 2 corresponds to the green LED and the LED corresponds to the red LED in the cellular interface. It is also noted that the RF fault module does not accumulate fractional time windows adding up to the prescribed time period, and fractional time windows are ignored, the module looks only for one full time period, such as the preset 50 seconds or 90 seconds to activate.

To further ensure communication link integrity, the system includes a computer program on the cellular network computer. This program incorporates all of the cellular network telephone numbers with their corresponding electronic serial numbers (ESN) assigned to cellular transceivers used to transmit alarm conditions from subscriber premises to a central monitoring station as well as the cellular network telephone numbers and ESN's of cellular transceivers located at central monitoring stations for purposes of receiving alarm signals from various subscriber premises.

Using this special software package, the cellular network main computer constantly scans the entire local cellular network to ascertain that those particular cellular transceivers as "flagged" in the computer memory are indeed on line and operable. This is done using the special software package to periodically interrogate each of the cellular transceivers being monitored by sending a signal to each of the cellular transceivers and requesting them to "test" their transceiver by sending a special signal that would be recognized by the main cellular network computer. If the special transmitted signal is not received from a certain cellular transmitter within an allotted time period, the main cellular network computer will recognize that particular cellular transceiver as not being operable and will report that condition to the central station microprocessor digital receiver associated with that particular cellular transceiver that has failed to respond. That notified central station will then take appropriate action.

The method of operation of the fault monitoring system is evident from the foregoing, but will be briefly reviewed for the sake of clarity. One of the alarm sensors generates a signal responsive to an event at the subscriber premises, and the system attempts to transmit appropriate data from the subscriber site to the monitoring station using the cellular telecommunication network. This data is conditionally transmitted over the backup landline communication link if the cellular link cannot be completed. In one form of the invention, the cellular network may include several telephone numbers at the same monitoring station or at several different monitoring stations, and the cellular network attempts to communicate with each of these numbers and/or stations in turn before switching to the landline link. The system also monitors the integrity of both links on a continuous basis so that a switch from one link to another can be effected before an alarm signal must be communicated. The RF fault modules are used to effect these integrity checks and include a plurality of radio frequency service lights that are monitored in one form of the system. As mentioned above, the cellular link is checked in one form of the invention by waiting an appropriate time period for the cellular link to be completed before switching either monitoring stations or switching to the backup landline link. The landline link is checked the same way in one form of the invention. In this manner, the switching function will not be performed at the same time as the data communications associated with the alarm functions. The system also monitors each alarm sensor to determine if it is in proper operating condition to further ensure the integrity of the overall system.

Figure 5:
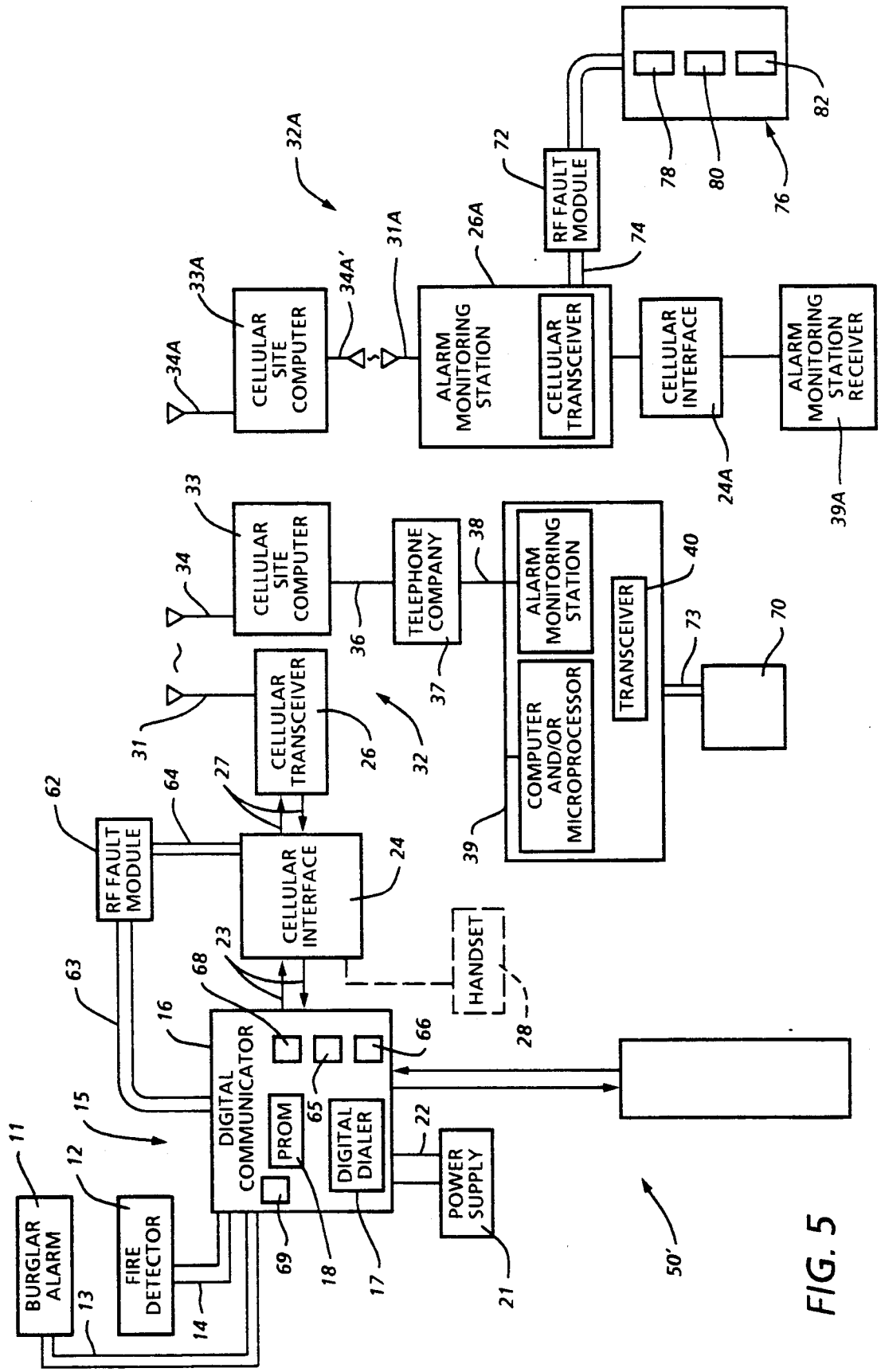
FIG. 5 illustrates the overall premises-monitoring system of the present invention with a radio link as the backup communications link.

As indicated in FIG. 5, the backup system can include a radio link 50' in place of the landline link 50 shown in FIG. 1. The system including the radio link 50' operates in the same manner as above described, in that the cellular link is the primary link, and the backup link only used in the event that the primary link has a fault detected therein. The radio link 50' includes a transmitter T at the subscriber station and a receiver R at the alarm monitoring station. The RF fault module 62 is connected to the cellular interface to continuously monitor the integrity of the cellular interface/transmitter as above described for the landline link 50. As above described, the RF fault module continuously monitors the cellular link and switches to the backup system, in this case, the radio link 50', in the event a fault is detected in the cellular link.

Figure 6:
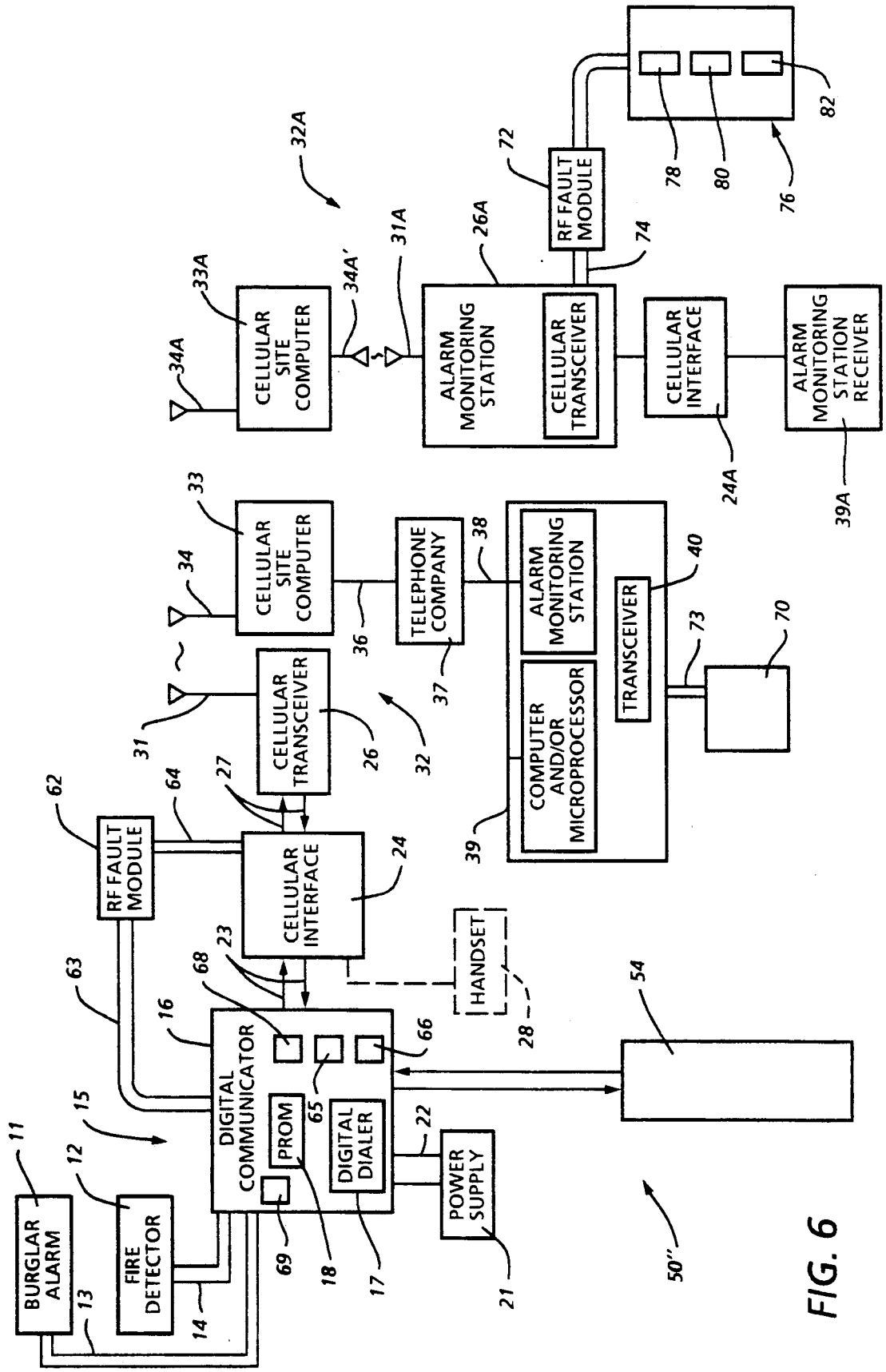
FIG. 6 illustrates the system of the present invention with an optical fiber system as the backup communications link.

As shown in FIG. 6, the backup system can also include a fiber optic system 50". The fiber optic system 50" operates in the manner of the above-described radio and cable systems, and is used in the event the RF fault module detects a fault in the cellular system. The fiber optic system 50" has all of the usual elements, such as splitters, couplers, multiplexers, repeaters, and the like as will occur to those skilled in the fiber optic communications are, and as discussed in textbooks such as "Fiber Optics Handbook for Engineers and Scientists" by Frederick C. Allen and published in 1990 by the McGraw-Hill Publishing Company. As above discussed, the RF fault module 62 constantly monitors the cellular system, and switches to the backup system, in this case, the fiber optic system 50", if a fault is detected in the cellular system.

It is understood that while certain forms of the present invention have been illustrated and described herein, it is not to be limited to the specific forms or arrangements of parts described and shown.

I claim:

1. A system for transmitting data between a subscriber site and at least one monitoring station, comprising:

sensor circuitry for generating data responsive to an event at the subscriber site;

first transmission circuitry responsive to said sensor circuitry operable to transmit the data from the subscriber site using a cellular telecommunication network;

second transmission circuitry responsive to said sensor circuitry operable to transmit the data from the subscriber site using a radio link telecommunications network;

first fault detect circuitry coupled to said first transmission circuitry and second fault detect circuitry at the monitoring station for continuously monitoring the operability of said cellular telecommunication network; and selection circuitry coupled to said first fault detect circuitry for automatically switching to said second transmission circuitry when said first fault detect circuitry detects a fault in said first transmission circuitry even if no event-related data is being transmitted over said first transmission circuitry.

2. The system of claim 1 and further comprising:

control circuitry for selecting each of a plurality of monitoring stations in sequence as the destination for the transmissions of the data and for prompting said first and second transmission circuities to transmit the data to each of said plurality of monitoring stations.

3. The system of claim 1 wherein said sensor circuitry comprises a plurality of alarm sensors each operable to detect the occurrence of an event.

4. The system of claim 1 wherein said first transmission circuitry comprises digital communication circuitry operable to receive data generated at the subscriber site and generate signals to be transmitted using said cellular telecommunication network.

5. The system of claim 4 wherein said digital communication circuitry comprises:

a digital dialer operable to dial a plurality of different telephone numbers, each of said numbers associated with at least one monitoring station; and memory circuitry for storing dialing information including said plurality of different telephone numbers.

6. The system of claim 4 wherein said digital communication circuitry comprises a microprocessor operable to control the transmission of data through said cellular telecommunications network.

7. The system of claim 4 wherein said first transmission circuitry further comprises a cellular transceiver coupled to said digital communication circuitry and operable to transmit to and receive from said cellular telecommunications network radio frequency signals including said signals generated by said digital communication circuitry.

8. The system of claim 5 wherein said memory circuitry comprises a programmable read only memory.

9. The system of claim 7 wherein said first transmission circuitry further comprises a cellular interface coupled between said digital communication circuitry and said cellular transceiver and operable to convert data received from said digital communication circuitry into a form transmittable using said cellular telecommunication network.

10. The system of claim 9 wherein said first fault detect circuitry coupled to said cellular interface.

11. The system defined in claim 1 wherein said fault detect circuitry includes a jumper.

12. The system defined in claim 11 wherein said fault detect circuitry further includes a timing delay circuit connected to said jumper.

13. The system defined in claim 12 wherein said timing delay circuit includes means for activating an alarm after a preset number of time periods.

14. The system defined in claim 13 further including a computer controlled supervisory system.

* * * * *